United States Patent
Maciocco et al.

(10) Patent No.: US 9,311,145 B2
(45) Date of Patent: Apr. 12, 2016

(54) USING PLATFORM IDLE DURATION INFORMATION TO NOTIFY PLATFORM DEVICES OF UPCOMING ACTIVE PERIODS

(71) Applicants: Christian Maciocco, Portland, OR (US); Ohad Falik, Kfar Saba (IL); Ren Wang, Portland, OR (US); Tsung-Yuan C. Tai, Portland, OR (US)

(72) Inventors: Christian Maciocco, Portland, OR (US); Ohad Falik, Kfar Saba (IL); Ren Wang, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 13/719,898

(22) Filed: Dec. 19, 2012

(65) Prior Publication Data

US 2014/0173636 A1    Jun. 19, 2014

(51) Int. Cl.
| | |
|---|---|
| G06F 3/00 | (2006.01) |
| G06F 9/48 | (2006.01) |
| G06F 9/54 | (2006.01) |
| G06F 1/32 | (2006.01) |

(52) U.S. Cl.
CPC ............ *G06F 9/4893* (2013.01); *G06F 1/3206* (2013.01); *G06F 9/54* (2013.01); *Y02B 60/144* (2013.01)

(58) Field of Classification Search
CPC .......... G06F 9/541; G06F 9/54; G06F 3/0481
USPC ........................................................ 719/318
See application file for complete search history.

(56) References Cited

U.S. PATENT DOCUMENTS

| | | | | |
|---|---|---|---|---|
| 7,430,673 | B2* | 9/2008 | Kardach et al. ............... | 713/300 |
| 7,766,692 | B2* | 8/2010 | Johnsen et al. ............... | 439/488 |
| 7,827,319 | B2* | 11/2010 | Kimura et al. .................... | 710/5 |
| 8,099,731 | B2 | 1/2012 | Li et al. | |
| 8,612,998 | B2 | 12/2013 | Wang et al. | |
| 8,959,531 | B2 | 2/2015 | Wang et al. | |
| 2003/0117440 | A1* | 6/2003 | Hellyar et al. ................. | 345/767 |
| 2004/0001101 | A1* | 1/2004 | Trajkovic et al. ............. | 345/781 |
| 2005/0120256 | A1 | 6/2005 | Lu | |
| 2006/0004661 | A1* | 1/2006 | Bacon ............................ | 705/50 |
| 2006/0271878 | A1* | 11/2006 | Hashimoto ................... | 715/781 |
| 2006/0288240 | A1 | 12/2006 | Kardach et al. | |
| 2007/0005995 | A1 | 1/2007 | Kardach et al. | |

(Continued)

FOREIGN PATENT DOCUMENTS

| | | |
|---|---|---|
| TW | 200820084 A | 5/2008 |
| TW | 201217973 A | 5/2012 |
| TW | 201245957 A | 11/2012 |
| WO | 2012096951 A2 | 7/2012 |

OTHER PUBLICATIONS

Lakshman, Window-based error recovery and flow control with a slow acknowledgement channnel : a study of TCP/IP performance, 1997.*

International Search Report and Written Opinion received for PCT Patent Application No. PCT/US2013/047237, mailed on Sep. 26, 2013, 10 pages.

*Primary Examiner* — Lechi Truong
(74) *Attorney, Agent, or Firm* — Jordan IP Law, LLC

(57) ABSTRACT

Methods and systems may provide for determining a next active window for a platform and notifying one or more of a plurality of devices of the platform of the next active window being determined. Additionally, one or more of the plurality of devices may be notified of an onset of the next active window. In one example, a pre-warm message is issued to notify one or more of the plurality of devices of the next active window being determined.

19 Claims, 4 Drawing Sheets

(56) References Cited

U.S. PATENT DOCUMENTS

| | | |
|---|---|---|
| 2008/0104604 A1 | 5/2008 | Li et al. |
| 2010/0077243 A1 | 3/2010 | Wang et al. |
| 2011/0264937 A1 | 10/2011 | Meisner et al. |
| 2012/0079482 A1 | 3/2012 | Wang et al. |
| 2012/0173593 A1 | 7/2012 | Jogand-Coulomb et al. |
| 2014/0101674 A1 | 4/2014 | Wang et al. |
| 2015/0113543 A1 | 4/2015 | Wang et al. |

* cited by examiner

US 9,311,145 B2

USING PLATFORM IDLE DURATION INFORMATION TO NOTIFY PLATFORM DEVICES OF UPCOMING ACTIVE PERIODS

CROSS-REFERENCE TO RELATED APPLICATIONS

The present application is related to U.S. patent application Ser. No. 13/537,260 filed on Jun. 29, 2012.

BACKGROUND

1. Technical Field

Embodiments generally relate to power management in computing platforms. More particularly, embodiments relate to the use of platform and device idle duration information to notify platform internal and/or external peripheral devices of upcoming active periods.

2. Discussion

Conventional mobile computing platforms may enter low power (e.g., idle, sleep states) in order to improve energy efficiency. In such cases, a central processing unit (CPU) of the platform may use an optimized buffer flush/fill (OBFF) signal to inform other platform devices that the CPU is active. Thus, a device detecting the OBFF signal may use platform resources while the OBFF signal is asserted at a reduced overall energy efficiency cost since the platform is already active. For example, a communication device might coalesce content during periods of platform inactivity and conduct DMA (direct memory access) processing of the coalesced content upon detection of the OBFF signal. While such an approach may be suitable under certain circumstances, there remains considerable room for improvement.

For example, some devices, such as wireless communication devices, may autonomously enter low power states during periods of CPU inactivity, wherein the process of exiting a given low power state may take longer than the active period of the OBFF signal. As a result, the wireless communication device may conduct DMA processing of the coalesced content and generate an interrupt that wakes up the CPU an additional time if the active period of the OBFF signal has already ended. Accordingly, a negative impact on the overall platform energy efficiency may be experienced.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
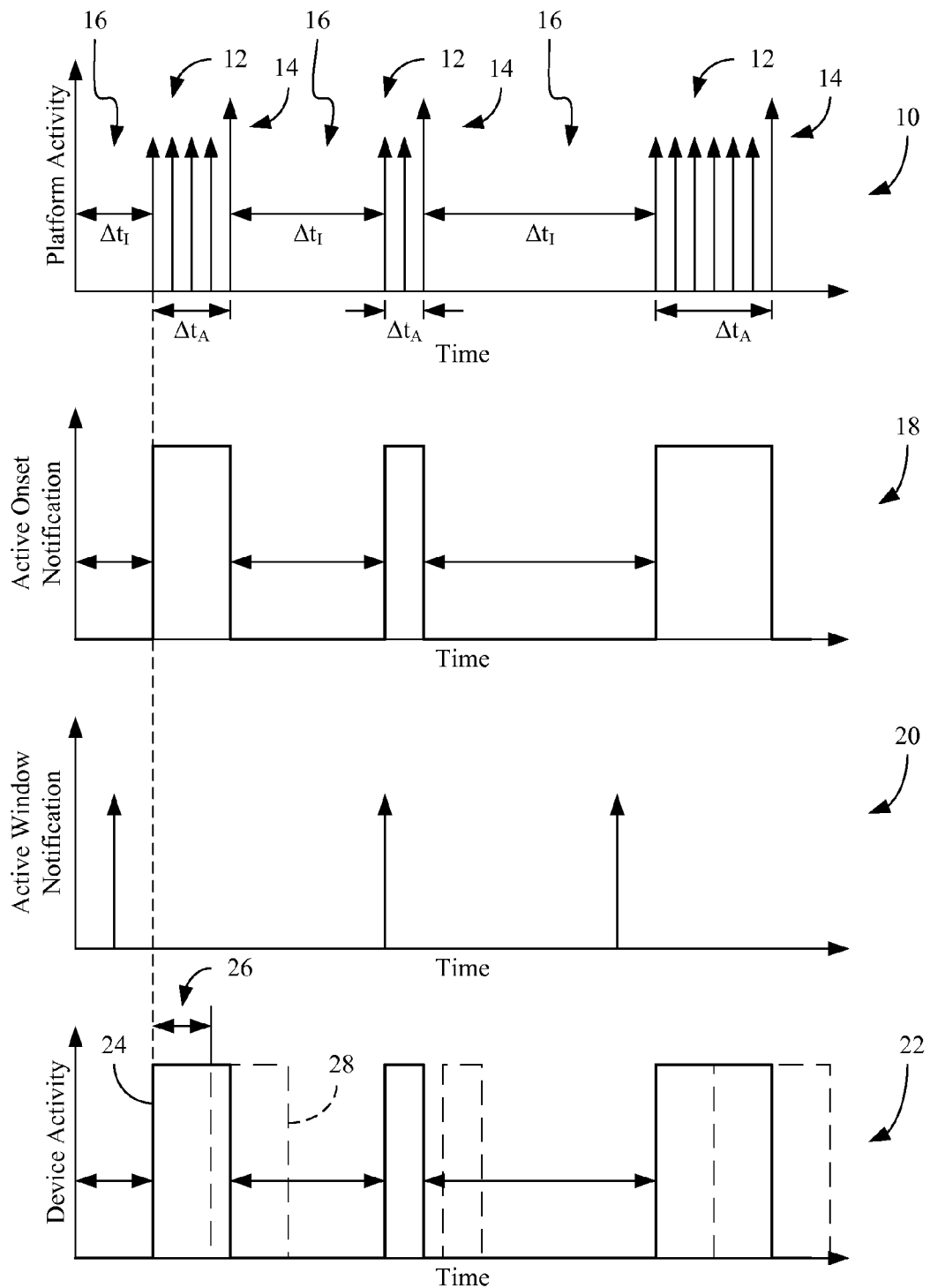
FIG. 1 is a timing diagram of an example of a set of plots representing activity on a computing platform according to an embodiment.

Turning now to FIG. 1, a set of plots for a platform having one or more processors and other platform devices is shown. In the illustrated example, a platform activity plot 10 demonstrates that activity 12 and related interrupts 14 may be grouped/coalesced together into active windows ($\Delta t_A$) to create longer idle windows 16 ($\Delta t_1$) for the platform in between the active windows. For example, the first active window includes four device DMA events followed by an interrupt, the second active window includes two device DMA events followed by an interrupt, the third active window includes six device DMA events followed by an interrupt, and so forth, in the example shown. Longer idle windows 16 between the active windows may enable the processors and/or platform to enter deeper sleep states and in turn conserve more power.

Additionally, an active onset plot 18 shows that a notification signal such as an OBFF (optimized buffer flush/fill) signal may be used by the processor to notify the other devices on the platform when activity is occurring. As will be discussed in greater detail, an active window notification plot 20 demonstrates that "pre-warm" messages may be generated by the processor while still in an active state before each rising edge of the active onset plot 18 in order to notify the platform devices of the next active window being determined for the platform. Idle platform devices may therefore use the pre-warm messages to begin exiting their low power states prior to the onset of each active window.

As a result, a device activity plot 22 has an adjusted profile 24 that is aligned with the notification signal of the active onset plot 18. Of particular note is that the pre-warm messages enable the adjusted profile 24 to eliminate a latency 26 that would otherwise be associated with a conventional profile 28 of a system without the pre-warm messages. Simply put, the illustrated approach enables the platform devices to better align their activity with the remainder of the platform, whereas such an approach can improve power efficiency and extend battery life.

Figure 2:
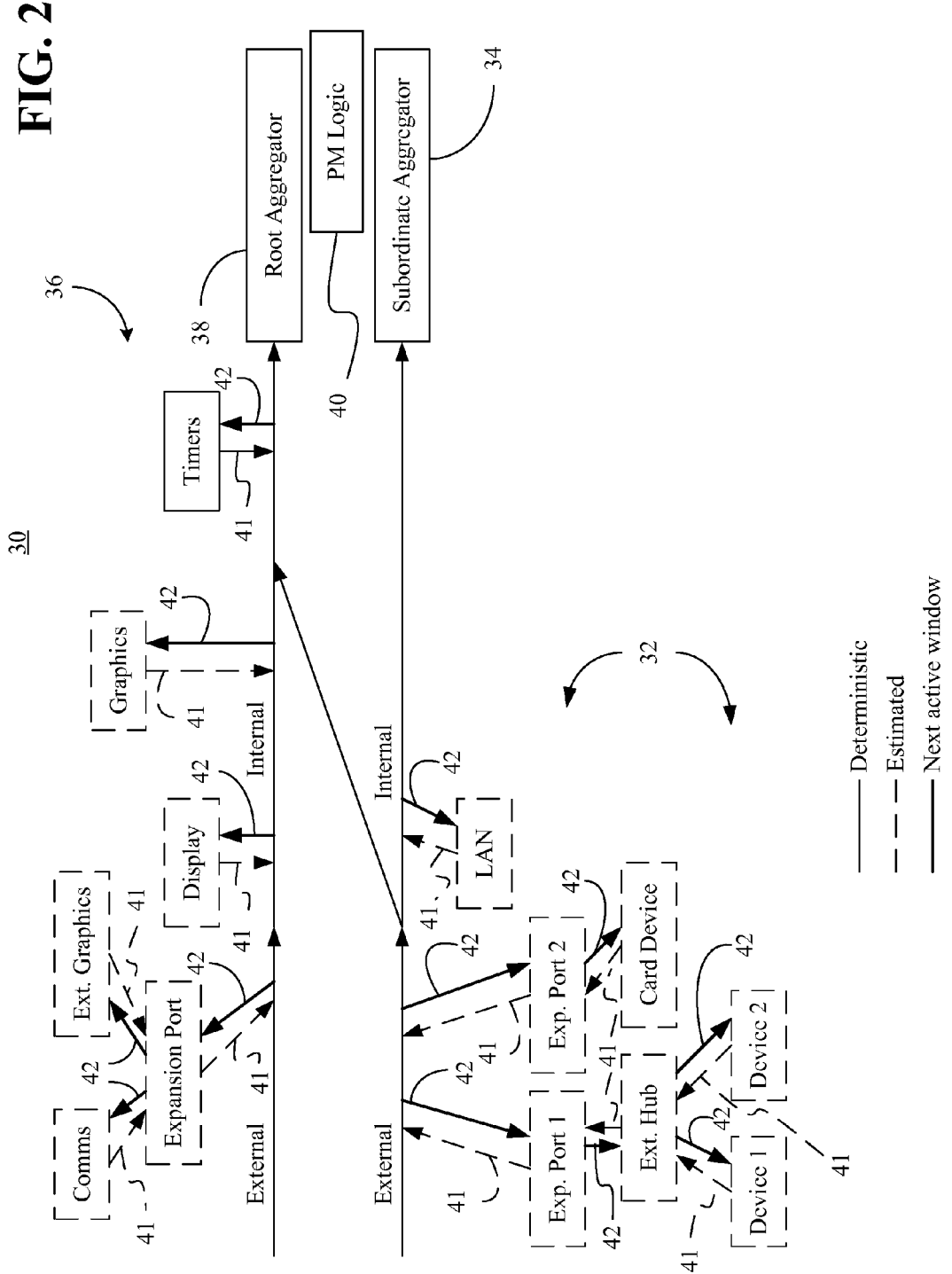
FIG. 2 is a block diagram of an example of a messaging architecture according to an embodiment.

FIG. 2 shows a messaging architecture 30, wherein the architecture 30 may be part of a device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). In the illustrated example, a first set of devices 32 report idle duration information 41 to a subordinate aggregator 34, and a second set of devices 36 report idle duration information 41 to a root aggregator 38. The idle duration information 41 may be carried from the devices 32, 36 to the aggregators 34, 38 using, for example, specific bus primitives such as a PCIe (Peripheral Components Interconnect Express, e.g., PCI Express×16 Graphics 150 W-ATX Specification 1.0, PCI Special Interest Group) VDM (vendor defined message) or writes to specific memory addresses. Additionally, the aggregators 34, 38 can track the source of the idle duration information 41 via, for example, identifying the downstream port from which idle duration messages originate or using global enumeration schemes such as the source BDF (bus, device, function) information that is reported in PCIe messages.

In one example, the root aggregator 38 executes on a processor (not shown) such as central processing unit (CPU) of the architecture 30, and the subordinate aggregator 34 executes on an input/output (IO) subsystem (not shown) of the architecture 30. In such a case, some devices in the first set of devices 32 might be considered external to the IO subsystem (e.g., "Device 1", "Device 2", "Card Device"), whereas other devices in the first set of devices 32 may be considered internal to the IO subsystem (e.g., local area network/LAN). Similarly, some devices in the second set of devices 36, may be considered external to the processor (e.g., "Comms", "Ext. Graphics"), whereas other devices in the second set of devices could be considered internal to the processor (e.g., "Graphics", "Timers"). The idle duration information 41 received from the devices 32, 36 may be classified by the aggregators 34, 38 as deterministic or estimated (e.g., opportunistic), based on the type of device sending the idle duration information 41.

In general, deterministic devices may be devices that are not expected to generate traffic for a specified period and are known to wake and begin conducting activity when the specified period ends. Such a device may generate traffic before the specified period ends, in which case the device in question may expect such traffic to be serviced according to a maximum latency requested by the device. The requested maximum latency may therefore establish a QoS (quality of service) "floor" for each deterministic device. Delayed servicing, however, may be relatively infrequent (e.g., an exception to normal operation) in many circumstances. Thus, devices such as the timers (e.g., high performance timer/HPET) in the second set of devices 36 may be considered deterministic. Deterministic idle duration information may also be received from external devices such as displays, cameras, and so forth.

Estimated devices, on the other hand, may be devices in which there is a relatively high likelihood that the device will not generate traffic for a specified period of time, wherein the device might not have traffic when the specified period of time expires. Examples of such devices may include, for example, internal and/or external graphics devices, network devices (e.g., extensible host controller interface/XHCI, wired/wireless devices) and other communication devices having buffers that fill up based on incoming traffic or scheduled windows of operation during which activity may occur.

The illustrated architecture 30 also includes power management (PM) logic 40 that is configured to select optimal platform idle durations for the platform based on the idle duration information 41 collected from the devices 32, 36. Thus, the PM logic 40 might determine the minimum deterministic idle duration reported by the devices 32, 36, and use that idle duration as the platform idle duration, in one example. As will be discussed in greater detail, each platform idle duration may be used to determine the next active window, which may in turn be used to issue pre-warm messages 42 back to the devices 32, 36.

The pre-warm messages 42 may be issued via a low power channel such as, for example, an I²C (Inter-Integrated Circuit, e.g., I2C Specification UM10204, Rev. 03, Jun. 19, 2007, NXP Semiconductors) side-band channel or other type of control channel and/or bus. In one example, MCTP (Management Component Transport Protocol, e.g., MCTP Base Specification, Version 1.1.0, Apr. 22, 2012, Distributed Management Task Force, Inc./DMTF) may be used to packetize the pre-warm messages due to its power efficient signaling configuration. Other protocols may also be used, depending upon the circumstances. Any time skew associated between the aggregators 34, 38 and the devices 32, 36 may be accounted for by using a clock drift compensation scheme in which a device wait window is implemented for devices having a clock that is faster than the aggregator clock and an aggregator wait window is implemented for aggregators having a clock that is faster than the device clock. In addition to indicating when the next active window will occur, each pre-warm message 42 may indicate whether the current platform idle duration is deterministic or estimated, wherein one or more of the platform devices 32, 36 may decide whether to wake themselves up for the next active window based at least in part on the type of active window. For example, a device may follow a policy in which the device wakes up for the next active window whenever the current platform idle duration is deterministic. Other approaches may also be used, as appropriate.

Figure 3:
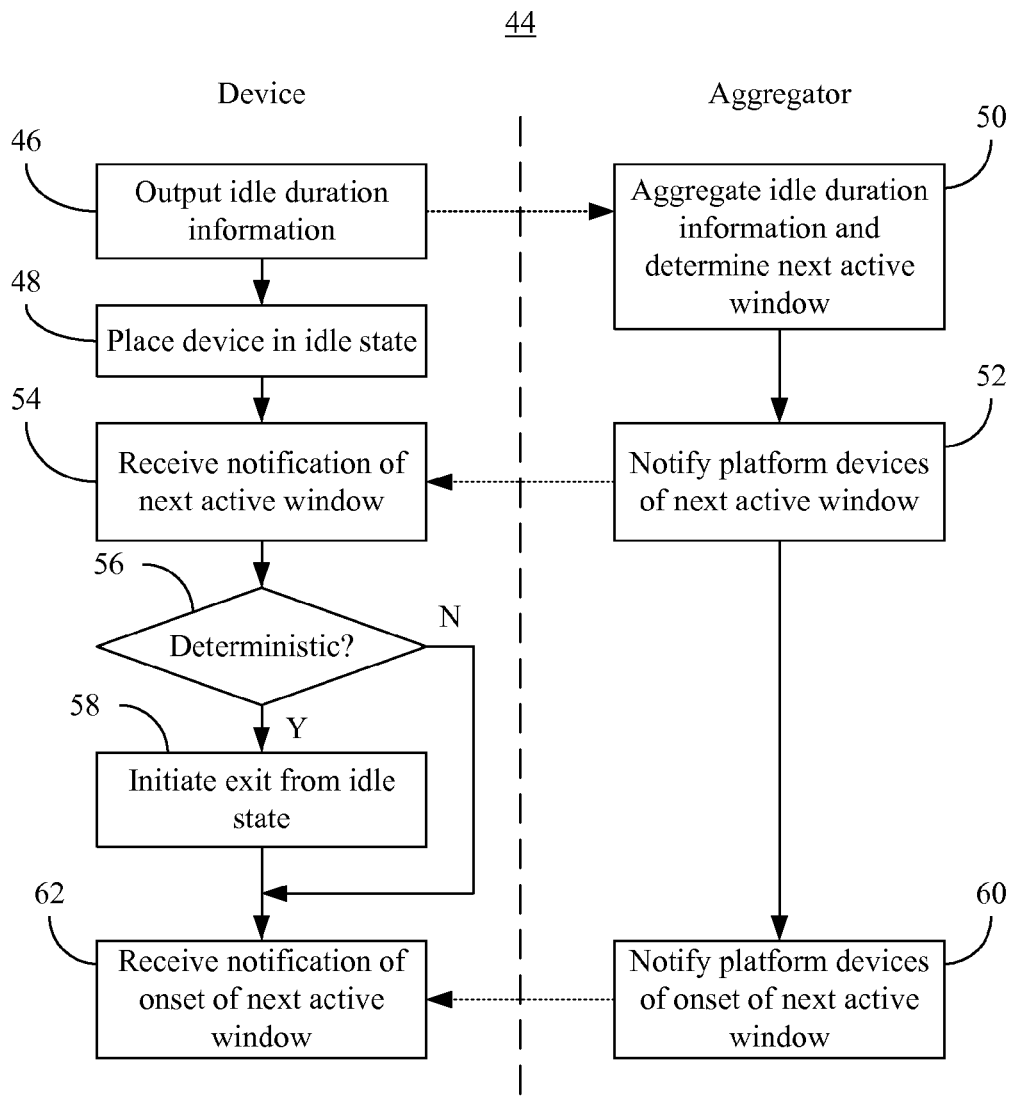
FIG. 3 is a flowchart of an example of a method of operating a platform according to an embodiment.

FIG. 3 shows a method 44 of operating a platform. The method 44 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated device processing block 46 provides for outputting idle duration information to an aggregator (e.g., root and/or subordinate), wherein the device may be placed in an idle state at block 48. In one example, the idle state is an ACPI (Advanced Configuration and Power Interface, e.g., ACPI Specification, Rev. 4.0a, Apr. 5, 2010) low power state, although other types of idle states may also be used. Meanwhile, aggregator block 50 may aggregate idle duration information from a plurality of platform devices and determine a next active window for the platform. One or more of the platform devices may be notified of the next active window at aggregator block 52, wherein illustrated device block 54 receives the notification of the next active window.

A determination may be made at block 56 as to whether the current platform idle duration is deterministic or estimated (e.g., opportunistic). If the current platform idle duration is deterministic, device block 58 may initiate an exit of the device from the idle state when the platform idle duration time-out nears expiration, accounting for the device idle state exit latency. Illustrated aggregator block 60 notifies the platform devices of the onset of the next active window. The onset notification may be conducted by, for example, asserting an OBFF signal via a PCIe link, as already noted. Device block 62 may provide for receiving the notification of the onset of the next active window. Use of the notification at block 52 may enable the reduction and/or elimination of exit latencies such as the latency 26 (FIG. 1), already discussed.

Figure 4:
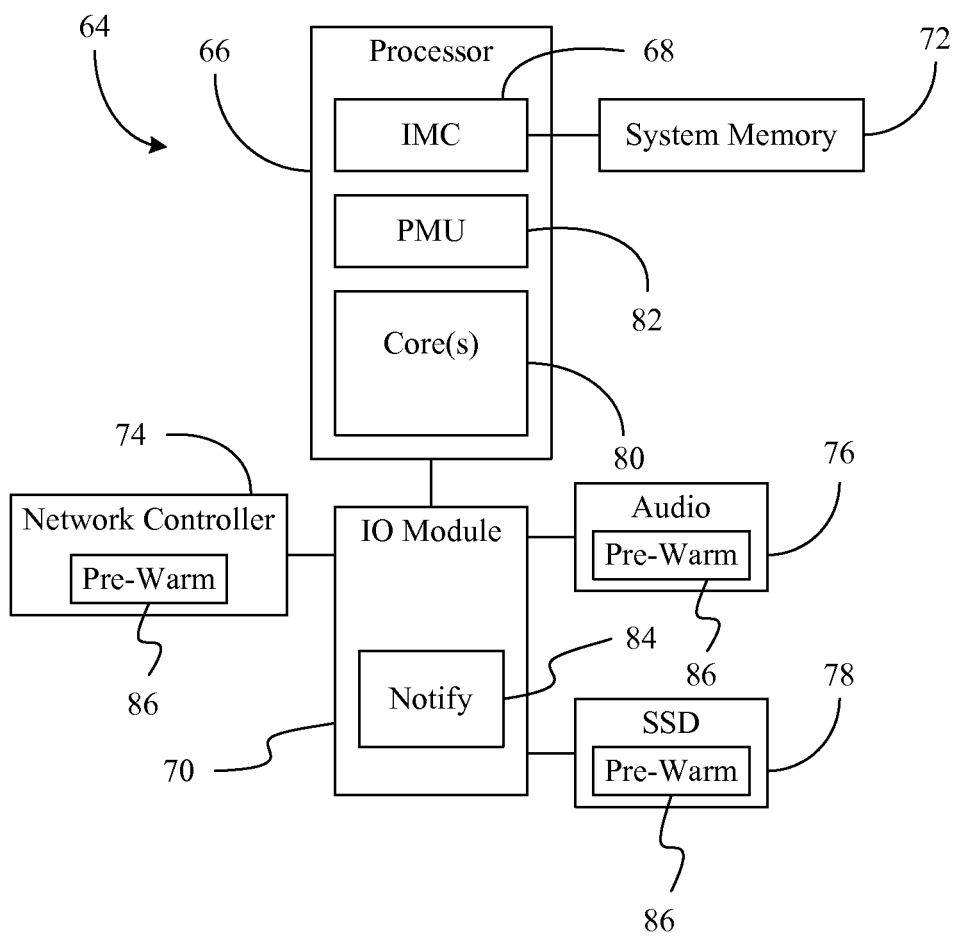
FIG. 4 is a block diagram of an example of a platform according to an embodiment.

Turning now to FIG. 4, a platform 64 is shown. The platform 64 may be part of a mobile device having computing functionality (e.g., PDA, laptop, smart tablet), communications functionality (e.g., wireless smart phone), imaging functionality, media playing functionality (e.g., smart TV), or any combination thereof (e.g., MID). In the illustrated example, the platform 64 includes a processor 66, an integrated memory controller (IMC) 68, an IO module 70, system memory 72, a network controller (e.g., network interface card/NIC) 74, an audio IO device 76 and a solid state disk (SSD) 78. The processor 66, which may include a core region with one or several processor cores 80, may use a power management unit (PMU) 82 to place its cores 80 into one or more active and/or sleep states based on performance and/or power management concerns, as already noted.

The illustrated IO module 70, sometimes referred to as a Southbridge or South Complex of a chipset, functions as a host controller and communicates with the network controller 74, which could provide off-platform communication functionality for a wide variety of purposes such as, for example, cellular telephone (e.g., Wideband Code Division Multiple Access/W-CDMA (Universal Mobile Telecommunications System/UMTS), Fourth Generation Long Term Evolution/4G LTE, etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 70 may also include one or more wireless hardware circuit blocks to support such functionality. Although the processor 66 and the IO module 70 are illustrated in separate blocks, they may be implemented on the same semiconductor die as an integrated system on chip (SoC).

The SSD 78 may include one or more NAND (negated AND) chips and might be used to provide high capacity data storage and/or a significant amount of parallelism. There may also be solutions that include NAND controllers implemented as separate ASIC controllers being connected to the IO module 70 on standard buses such as a Serial ATA (SATA, e.g., SATA Rev. 3.0 Specification, May 27, 2009, SATA International Organization/SATA-IO) bus, or a PCIe bus. The SSD 78 could also be used as a USB (Universal Serial Bus, e.g., USB Specification 3.0, USB Implementers Forum) flash storage device.

The illustrated IO module 70 includes a notification module 84 having aggregator logic configured to determine a next active window for the platform 64, and first notification logic to notify one or more devices such as, for example, the network controller 74, the audio IO device 76 and/or the SSD 78, of the next active window. The devices may include pre-warm logic 86 configured to place the respective device in an idle state, receive the notification of the next active window associated with the platform 64, and determine whether to initiate an exit of the respective device from the idle state based at least in part on the next active window. The notification module 84 may also have second notification logic to notify one or more of the platform devices of the onset of the next active window. The notification module 84 may be implemented elsewhere in the platform 64 such as, for example, on the processor 66.

Embodiments may therefore include a platform having a plurality of devices and aggregator logic to determine a next active window for the platform. The platform may also have first notification logic to notify one or more of the plurality of devices of the next active window being determined, and second notification logic to notify one or more of the plurality of devices of an onset of the next active window.

Embodiments may also include an apparatus having aggregator logic to determine a next active window for the platform. The apparatus may also have first notification logic to notify one or more of the plurality of devices of the next active window being determined, and second notification logic to notify one or more of the plurality of devices of an onset of the next active window.

Embodiments may also include at least one machine readable storage medium having a set of instructions which, if executed by at least one processor, cause a platform to determine a next active window for the platform. The instructions, if executed, may also cause the platform to notify one or more of a plurality of devices on the platform of the next active window, and notify one or more of the plurality of devices of an onset of the next active window.

Embodiments may also include a device having logic to place the device in an idle state and receive a notification of a next active window associated with a platform including the device. The logic may also determine whether to initiate an exit of the device from the idle state based on the next active window.

Techniques described herein may therefore provide key improvements beyond conventional OBFF signaling to ensure that peripheral devices will be ready on time when the OBFF signal is actually asserted. As a result, techniques described herein may optimize device activity alignment and eliminate device interrupts that force the platform to exit low power states more often than necessary. Thus, platform energy optimization can be achieved and battery life may be extended. Such an approach may be particularly advantageous in wireless networking settings.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Moreover, any use of the terms "first", "second", etc., does not limit the embodiments discussed to the number of components listed.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A platform comprising:
a processor; a plurality of devices;
aggregator logic to determine a next active window for the platform wherein the active window represents a period of time when the a processor is in a non-idle state;
first notification logic to notify one or more of the plurality of devices of the next active window being determined; and
second notification logic to notify one or more of the plurality of devices of an onset of the next active window, wherein the plurality of devices includes one or more of a timer, an audio device, a display device, a camera device or a network interface device;
wherein the first notification logic is to issue a pre-warm message to notify one or more of the plurality of devices of the next active window being determined;
including one or more side-band channels coupled to the first notification logic and one or more of the plurality of devices, wherein the pre-warm message is to be issued via the one or more side-band channels.

2. The platform of claim 1, wherein the pre-warm message is to indicate; whether a current platform idle duration is deterministic or estimated.

3. The platform of claim 1, wherein at least one of the one or more side-band channels is an Inter-Integrated Circuit (I2C) side-band channel.

4. The platform of claim 1, wherein the second notification logic is to assert an optimized buffer flush/fill (OBFF) signal to notify one or more of the plurality of devices of the onset of the next active window.

5. The platform of claim 1, wherein the aggregator logic is to determine the next active window based on a plurality of idle duration messages from the plurality of devices.

6. An apparatus comprising:
a processor;
aggregator logic to determine a next active window for a platform including the processor wherein the active window represents a period of time when the a processor is in a non-idle state;
first notification logic to notify one or more of a plurality of devices on the platform of the next active window being determined; and
second notification logic to notify one or more of the plurality of devices of an onset of the next active window, wherein the plurality of devices includes one or more of a timer, an audio device, a display device, a camera device or a network interface device;
the first notification logic is to issue a pre-warm message to notify one or more of the plurality of devices of the next active window being determined;
wherein the pre-warm message is to be issued via one or more side-band channels.

7. The apparatus of claim 6, wherein the pre-warm message is to indicate whether a current platform idle duration is deterministic or estimated.

8. The apparatus of claim 6, wherein the pre-warm message is to be issued via one or more Inter-Integrated Circuit (I2C) side-band channels.

9. The apparatus of claim 6, wherein the second notification logic is to assert an optimized buffer flush/fill (OBFF) signal to notify one or more of the plurality of devices of the onset of the next active window.

10. The apparatus of claim 6, wherein the aggregator logic is to determine the next active window based on a plurality of idle duration messages from the plurality of devices.

11. At least one machine readable storage medium comprising set of instructions which, if executed by at least one processor, cause a platform comprising a processor and a plurality of devices to:
determine a next active window for the platform including the processor wherein the active window represents a period of time when the a processor is in a non-idle state;
Notify one or more of a plurality of devices on the platform of the next active window being determined; and
notify one or more of the plurality of devices of an onset of the next active window, wherein the plurality of devices includes one or more of a timer, an audio device, a display device, a camera device or a network interface device;
wherein the instructions, if executed, cause the platform to issue a pre-warm message to notify me or more of the plurality of devices of the next active window being determined;
wherein the pre-warm message is to be issued via one or more side-band channels.

12. The at least one machine readable storage medium of claim 11, wherein the pre-warm message is to indicate whether a current platform idle duration is deterministic or estimated.

13. The at least one machine readable storage medium of claim 11, wherein the pre-warm message is to be issued via one or more Inter-Integrated Circuit (I2C) side-band channels.

14. The at least one machine readable storage medium of claim 11, wherein the instructions, if executed, cause the platform to assert an optimized buffer flush/fill (OBFF) signal to notify one or more of the plurality of devices of the onset of the next active window.

15. The at least one machine readable storage medium of claim 11, wherein the next active window is to be determined based on a plurality of idle duration messages from the plurality of devices.

16. A device comprising:
a processor;
aggregator logic to determine a next active window for the platform wherein the active window represents a period of time when the a processor is in a non-idle state;
first notification logic to notify one or more of the plurality of devices of the next active window being determined; and
second notification logic to notify one or more of the plurality of devices of an onset of the next active window, wherein the plurality of devices includes one or more of a timer, an audio device, a display device, a camera device or a network interface device;
wherein the instructions, if executed, cause the platform to issue a pre-warm message to notify me or more of the plurality of devices of the next active window being determined;
wherein the pre-warm message is to be issued via one or more side-band channels.

17. The device of claim 16, wherein the logic is to,
initiate the exit of the device from the idle state if the notification indicates that the next active window is deterministic, and
maintain the device in the idle state if the notification indicates that the next active window is estimated.

18. The device of claim 16, wherein the notification is to be received via a side-band channel.

19. The device of claim 16, wherein the logic is to receive a notification of an onset of the next active window.

* * * * *